United States Patent
Johnson et al.

(10) Patent No.: US 10,379,913 B2
(45) Date of Patent: Aug. 13, 2019

(54) SYSTEMS AND METHODS FOR IMPLEMENTING AN INTELLIGENT APPLICATION PROGRAM INTERFACE FOR AN INTELLIGENT OPTIMIZATION PLATFORM

(71) Applicant: SigOpt, Inc., San Francisco, CA (US)

(72) Inventors: Alexandra Johnson, San Francisco, CA (US); Patrick Hayes, San Francisco, CA (US); Scott Clark, San Francisco, CA (US)

(73) Assignee: SigOpt, Inc., San Francisco, CA (US)

( * ) Notice: Subject to any disclaimer, the term of this patent is extended or adjusted under 35 U.S.C. 154(b) by 0 days.

(21) Appl. No.: 16/359,107

(22) Filed: Mar. 20, 2019

(65) Prior Publication Data

US 2019/0213056 A1    Jul. 11, 2019

Related U.S. Application Data

(63) Continuation of application No. 16/173,737, filed on Oct. 29, 2018, now Pat. No. 10,282,237.

(60) Provisional application No. 62/578,886, filed on Oct. 30, 2017.

(51) Int. Cl.
   *G06F 9/54*      (2006.01)
   *G06F 11/34*    (2006.01)
   *G06N 20/00*   (2019.01)

(52) U.S. Cl.
   CPC ............ *G06F 9/54* (2013.01); *G06F 11/3495* (2013.01); *G06N 20/00* (2019.01)

(58) Field of Classification Search
   None
   See application file for complete search history.

(56) References Cited

U.S. PATENT DOCUMENTS

| | | |
|---|---|---|
| 8,364,613 B1 | 1/2013 | Lin et al. |
| 2016/0232540 A1 | 8/2016 | Gao et al. |
| 2018/0121797 A1 | 5/2018 | Prabhu et al. |

*Primary Examiner* — Craig C Dorais
(74) *Attorney, Agent, or Firm* — Jeffrey Schox; Padowithz Alce

(57) ABSTRACT

Systems and methods for implementing an application programming interface (API) that controls operations of a machine learning tuning service for tuning a machine learning model for improved accuracy and computational performance includes an API that is in control communication the tuning service that: executes a first API call function that includes an optimization work request that sets tuning parameters for tuning hyperparameters of a machine learning model; and initializes an operation of distinct tuning worker instances of the service that each execute distinct tuning tasks for tuning the hyperparameters; executes a second API call function that identifies raw values for the hyperparameters; and generates suggestions comprising proposed hyperparameter values selected from the plurality of raw values for each of the hyperparameters; and executes a third API call function that returns performance metrics relating to a real-world performance of the subscriber machine learning model executed with the proposed hyperparameter values.

20 Claims, 4 Drawing Sheets

200

Receiving Optimization Work Request 210

Implementing Plurality of Work Machines S220

Selecting Optimization Source(s) S230

Returning Response Using Partial Info S240

Storing Generated Suggestions S250

Implementing Optimization Feedback Loop S255

SYSTEMS AND METHODS FOR IMPLEMENTING AN INTELLIGENT APPLICATION PROGRAM INTERFACE FOR AN INTELLIGENT OPTIMIZATION PLATFORM

CROSS-REFERENCE TO RELATED APPLICATIONS

This is a application is a continuation U.S. application Ser. No. 16/173,737, filed 29 Oct. 2018, which claims the benefit of U.S. Provisional Application No. 62/578,886, filed 30 Oct. 2017, which are both incorporated herein in their entireties by this reference.

BACKGROUND

Modern machine learning capabilities are rapidly changing and improving how some of the most complex and data-intensive computing problems are solved. A performance of a machine learning model is governed mainly in the manner(s) in which the machine learning model is trained and based on the hyperparameters of the machine learning model set prior to the training of the model. As referenced in passing the hyperparameters of the machine learning models are parameters whose values are set prior to the commencement of the machine learning process rather than derived by the machine learning model during training. Example include the number of trees in a random forest or the number of hidden layers in a deep neural net. Adjusting the values of the hyperparameters of a machine learning model by any amount typically results in a large impact on a performance of the machine learning model.

However, many existing machine learning models are not implemented with optimal hyperparameters well-suited for achieving the best predictive performances. Rather, the many existing machine learning models are implemented with default hyperparameters that have not been optimized for a specific computing problem for which the machine learning models are being used.

Additionally, any existing system that enables optimization of hyperparameters of a machine learning model typically includes an extremely complex interface that may require significant coding capabilities and comprehension of the underlying software and hardware components of the system. Thus, making it difficult to efficiently and effectively perform optimizations and subsequent improvements of the machine learning models.

Thus, there is a need in the machine learning field to create an improved optimization platform to test and improve machine learning models (e.g., in-product machine learning models) and an associated Application Program Interface that enables developers to efficiently and effectively interact with a robust system implementing the evaluation framework. The embodiments of the present application described herein provide technical solutions that address, at least, the need described above, as well as the technical deficiencies of the state of the art described throughout the present application.

SUMMARY OF THE INVENTION

In one embodiment, a system implementing an application programming interface (API) that controls one or more operations of a machine learning tuning service for tuning a machine learning model for improved accuracy and computational performance, the system includes a machine learning tuning service that is hosted on a distributed networked system; an intelligent application programming interface (API) that is in operable control communication of the machine learning tuning service that: executes a first API call function that: includes an optimization work request that sets a plurality of tuning parameters for tuning, by the machine learning tuning service, hyperparameters of a subscriber machine learning model, wherein the subscriber machine learning model includes a machine learning model that is external to the machine learning tuning service and implemented by a subscriber to the machine learning tuning service; initializes an operation of each of a plurality of distinct tuning worker instances of the machine learning tuning service that execute distinct tuning tasks for tuning the hyperparameters of the subscriber machine learning model according to the plurality of tuning parameters; executes a second API call function that: identifies a plurality of raw values for the hyperparameters generated by the machine learning tuning service; generates one or more suggestions comprising proposed hyperparameter values selected from the plurality of raw values for each of the hyperparameters of the subscriber machine learning model; and executes a third API call function that returns to the machine learning tuning service performance metrics relating to a real-world performance of the subscriber machine learning model executed with the proposed hyperparameter values for the hyperparameters of the subscriber machine learning model.

In one embodiment, the hyperparameters comprise parameters of the subscriber machine learning model having values set before a training or the learning process applied to the subscriber machine learning model and are not derived during the training or the learning processing.

In one embodiment, executing the second API call function includes: instantiating a surrogate machine learning model for the subscriber machine learning model; and testing a performance of the surrogate machine learning model based on input of the plurality of raw values for each of the hyperparameters of the subscriber machine learning model.

In one embodiment, the surrogate machine learning model comprises a hypothesis of or a proxy for the subscriber machine learning model when a structure of the subscriber machine learning model is not known to the machine learning tuning service.

In one embodiment, instantiating the surrogate machine learning model includes estimating an algorithmic structure of the surrogate model based on the hyperparameters of the tuning work request and the plurality of raw values for each of the hyperparameters of the subscriber machine learning model.

In one embodiment, executing the second API call function further includes: identifying a subset of the plurality of raw values for each of the hyperparameters based on results of the testing with the surrogate machine learning model, wherein the proposed hyperparameter values of the one or more suggestions comprise the subset of the plurality of raw values.

In one embodiment, identifying the subset of the plurality of raw values for each of the hyperparameters includes identifying distinct raw values from the plurality of raw values that satisfy or exceed a performance threshold.

In one embodiment, the machine learning tuning service includes: a cluster of distinct machine learning tuning sources that operate to generate the plurality of raw values for the hyperparameters for the subscriber machine learning model, wherein each of the plurality of tuning worker machine selectively operates one distinct machine learning tuning source of the cluster of distinct machine learning tuning sources.

In one embodiment, the intelligent application programming interface (API) further: executes an intervening API call function to generate the one or more suggestions ahead of an estimated or a scheduled completion of the optimization work request, wherein in response to executing the intervening API call function, instantiating a surrogate machine learning model in lieu of the subscriber machine learning model; and testing a performance of the surrogate machine learning model based on input of the plurality of raw values for each of the hyperparameters of the subscriber machine learning model.

In one embodiment, in response to the intervening API call function, automatically selecting by one of the tuning worker machines one of the plurality of distinct machine learning tuning sources to generate a surrogate model for testing a performance of the plurality of raw values for the hyperparameters.

In one embodiment, executing the first API function call sets a mode of operation of the machine learning tuning service which is selected from a plurality of distinct modes of operation based on at least one tuning parameter provided with the optimization work request.

In one embodiment, executing the first API function call sets one or more switching conditions that, when satisfied, switches a mode of operation of the machine learning tuning service from a first mode of operation to a second mode of operation, wherein the machine tuning service optimizes the hyperparameters differently in the second mode of operation than in the first mode of operation.

In one embodiment, the operation of each of the plurality of distinct tuning worker instances is asynchronous.

In one embodiment, the machine learning tuning service executes a plurality of first API function calls for a plurality of optimization work requests for the subscriber to the machine learning tuning service, responsive to the execution of the plurality of first API function calls, the machine learning tuning service instantiates distinct clusters of tuning worker instances that each operate independently to optimize hyperparameters one of the plurality of optimization work requests.

In one embodiment, an online method implementing an application programming interface (API) that controls one or more operations of a machine learning tuning service for tuning a machine learning model for improved accuracy and computational performance, the online method includes implementing a remote machine learning tuning service that is hosted on a distributed networked system; implementing an application programming interface (API) that is in operable control communication of the machine learning tuning service that: executes a first API call function that: includes an optimization work request that sets a plurality of tuning parameters for tuning, by the machine learning tuning service, hyperparameters of a subscriber machine learning model, wherein the subscriber machine learning model includes a machine learning model that is external to the machine learning tuning service and implemented by a subscriber to the machine learning tuning service; initializes an asynchronous operation of each of a plurality of distinct tuning worker instances of the machine learning tuning service that execute distinct tuning tasks for tuning the hyperparameters of the subscriber machine learning model according to the plurality of tuning parameters; executes a second API call function that: identifies a plurality of raw values for the hyperparameters generated by the machine learning tuning service; generates one or more suggestions comprising proposed hyperparameter values selected from the plurality of raw values for each of the hyperparameters of the subscriber machine learning model; and executes a third API call function that returns to the machine learning tuning service performance metrics relating to a real-world performance of the subscriber machine learning model executed with the proposed hyperparameter values for the hyperparameters of the subscriber machine learning model.

DESCRIPTION OF THE PREFERRED EMBODIMENTS

Figure 1:
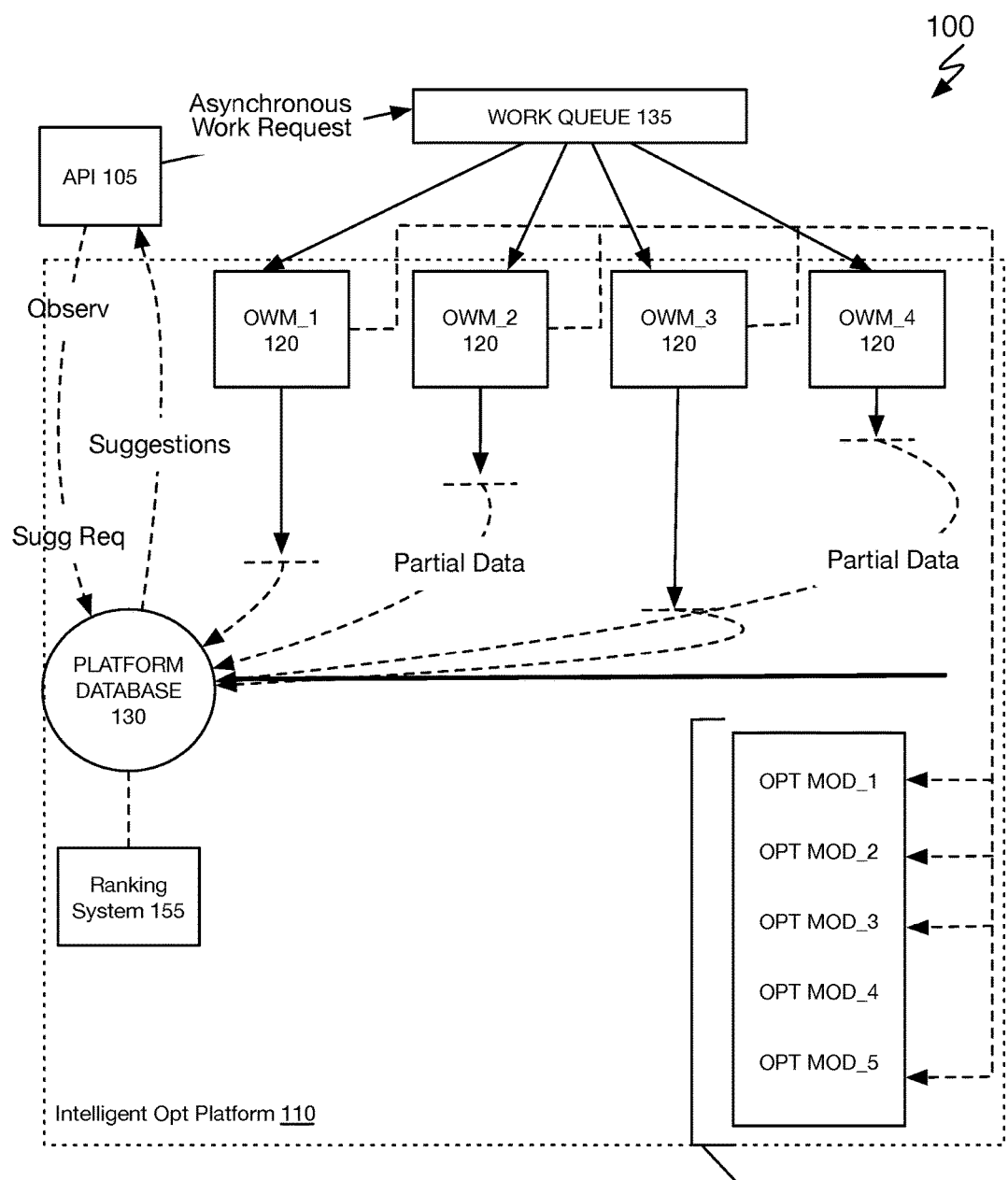
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, existing machine learning models tend to lack in predictive performance as well as speed in computation due to a lack of optimal hyperparameters used in the machine learning models during training. The lack of optimized hyperparameters well-suited to an underlying computing problem or the like adversely affect the computational capabilities of the machine learning model, in that, the resulting predictions or solutions of the model may not be accurate and the speed of computation of the machine learning model may be slow because the un-optimized or poorly optimized hyperparameters of the model may result in an increased workload (e.g., increased required computer processing, increased required data storage, etc.) to the computing system implementing the model and thereby resulting in many efficiencies therein.

Additionally, even in the circumstance that an attempt is made to optimize some of the hyperparameters of a machine learning model, the attempt to optimize the hyperparameters may fail due to many common optimization errors including: using inappropriate metrics and assumptions to test hyperparameters of an associated machine learning model or the like; overfitting a machine learning model during training that often results in a poor fit of the model to out of sample data or unseen data; using too few hyperparameters and failing to optimize all hyperparameters of a machine learning model; unskilled or improper hand-tuning, which is a highly inefficient optimization strategy at which humans are poor at performing high dimensional, non-convex optimization; grid searching over a space of possible hyperparameters which may grow the number of times a machine learning model must be evaluated due to an increase in dimensionality (i.e., increased hyperparameters); random searching which uses no intelligence in the optimization method and may result in unnecessarily high variance.

Accordingly, unintelligent optimization attempts of hyperparameters (or other model parameters) may result in high computational costs (e.g., high computer processing resources expenditures, etc.).

The embodiments of the present application, however, provide an intelligent optimization platform that functions to optimize hyperparameters and/or parameters of any type of model with significantly fewer evaluation thereby saving computational resources while greatly improving an overall performance of a model. In embodiments of the present application, the intelligent optimization platform includes an ensemble of parameter optimization models, which may include a combination of several distinct machine learning models and Bayesian optimization algorithms that may work in selective combinations to expediently tune hyperparameters or various parameters of complex external systems, simulations, and models.

Further, the embodiments of the present application include an intuitive and simplified Application Programming Interface (API) that enables users and/or developers to easily configure a work request, such as a hyperparameter optimization work request. A hyperparameter optimization work request as referred to herein generally relates to a request to optimize one or more hyperparameters of a model. The hyperparameter optimization work request may include an identification of the hyperparameters a user desires to optimize together with constraints or parameters required for experimenting or performing optimization trials using the system and/or methods described herein. The optimization work request may generally be generated using an API of the system 100, as described below. In a preferred embodiment, the optimization work request functions to trigger an operation of the intelligent optimization platform performing computations using the hyperparameters of the optimization work request. Additionally, in embodiments of the present application, using a limited number of simplified API calls, it is possible to integrate the sophisticated ensemble of Bayesian optimization techniques of the intelligent optimization platform to augment an existing machine learning pipeline.

Collaboratively, the intelligent optimization platform preferably functions to improve the computational capabilities of a machine learning model, such that the machine learning model performs at high levels of accuracy and further, computes predictions, suggestions, and other outcomes faster (e.g., up to one hundred times faster or more improvement in machine learning models, etc.) than unoptimized or poorly optimized machine learning models or other models. This, in turn, improves the functionality and operational speed and efficiency of the underlying computing system executing the machine learning model or other model.

1. System for Implementing an Intelligent API

As shown in FIG. 1, a system 100 an intelligent application program interface (API) 105, an intelligent model optimization platform 110, a plurality of queue working machines 120, a platform database 130, a shared work queue 135, and an ensemble of optimization models 140.

The system 100 preferably implements an intelligent model optimization platform 110 including an ensemble of Bayesian optimization processes and machine learning techniques that functions to automate an optimization of features and/or hyperparameters of a model, architecture of a model, and hyperparameters of a model using an ensemble of Bayesian optimization techniques, as described in U.S. patent application Ser. No. 15/977,168, U.S. Patent Application No. 62/587,827, and U.S. Patent Application No. 62/721,718, which are incorporated herein by this reference in their entireties.

The system 100 functions to implement an intelligent Application Program Interface (API) 105 for interacting and implementing complex optimization trials via the remote intelligent optimization platform 110. The API 105 may be specifically designed to include a limited number of API endpoints that reduce of complexity in creating an optimization work request, implementing optimization trials using the work request data, obtaining suggestions and/or results of the optimization trials, and potentially implementing an optimization feedback loop until a suitable optimization of an objective function of the work request is achieved in a minimal amount of time. The optimization work request, as referred to herein, generally relates to an API request that includes one or more parameters that a user is seeking to optimize and one or more constraints that the user desires for the optimization trials performed by the intelligent optimization platform 110.

In a preferred embodiment, the API 105 comprises a Representational State Transfer (ReST) API that relies mainly on a stateless, client-server, cacheable communications protocol and in many cases, the Rest API uses the HTTP protocol in connecting and interacting with software applications over the web and cloud (distributed network systems) services efficiently.

Figure 4:
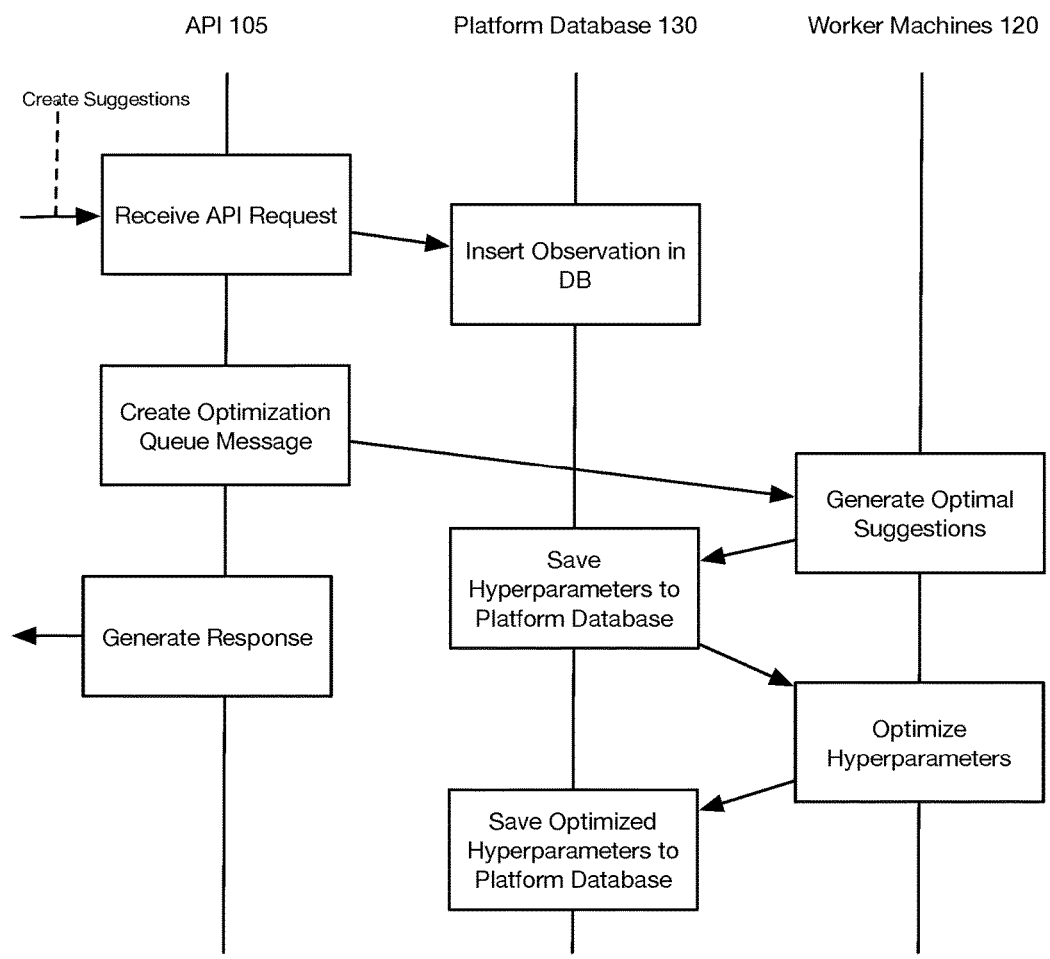
FIG. 4 illustrates schematic representation of a mixed system and process flow for implementing an intelligent optimization platform in accordance with one or more embodiments of the present application.

The API 105 may additionally be configured with logic that enables the API 105 to intelligently parse optimization work request data and/or augment the optimization work request data with metadata prior to passing the optimization work request to the shared work queue 135 of the intelligent optimization platform 110. As shown in FIG. 4, a mixed system and process flow is provided that illustrates an example interactions between the API 105 and one or more components of the intelligent optimization platform 110.

The intelligent optimization platform 110 includes the plurality of queue worker machines 120 (which may also be referred to herein as optimization worker machines), the platform data 130, the shared work queue 135 and the ensemble of optimization models 140. The intelligent optimization platform 110 generally functions to interact with the API server implementing the API 105 to receive API requests for implementing new optimization work requests and returning responses or suggestions to the API 105. Using the plurality of intelligent queue worker machines 120, the intelligent optimization platform 110 functions to asynchronously execute a plurality of optimization work requests in real-time and in parallel. This asynchronous execution and parallel processes of the intelligent optimization system 110 provides speed in computing efficiencies in the exploration and exploitation processes (generally, optimization) of features, hyperparameters, models and system architectures.

Figure 3:
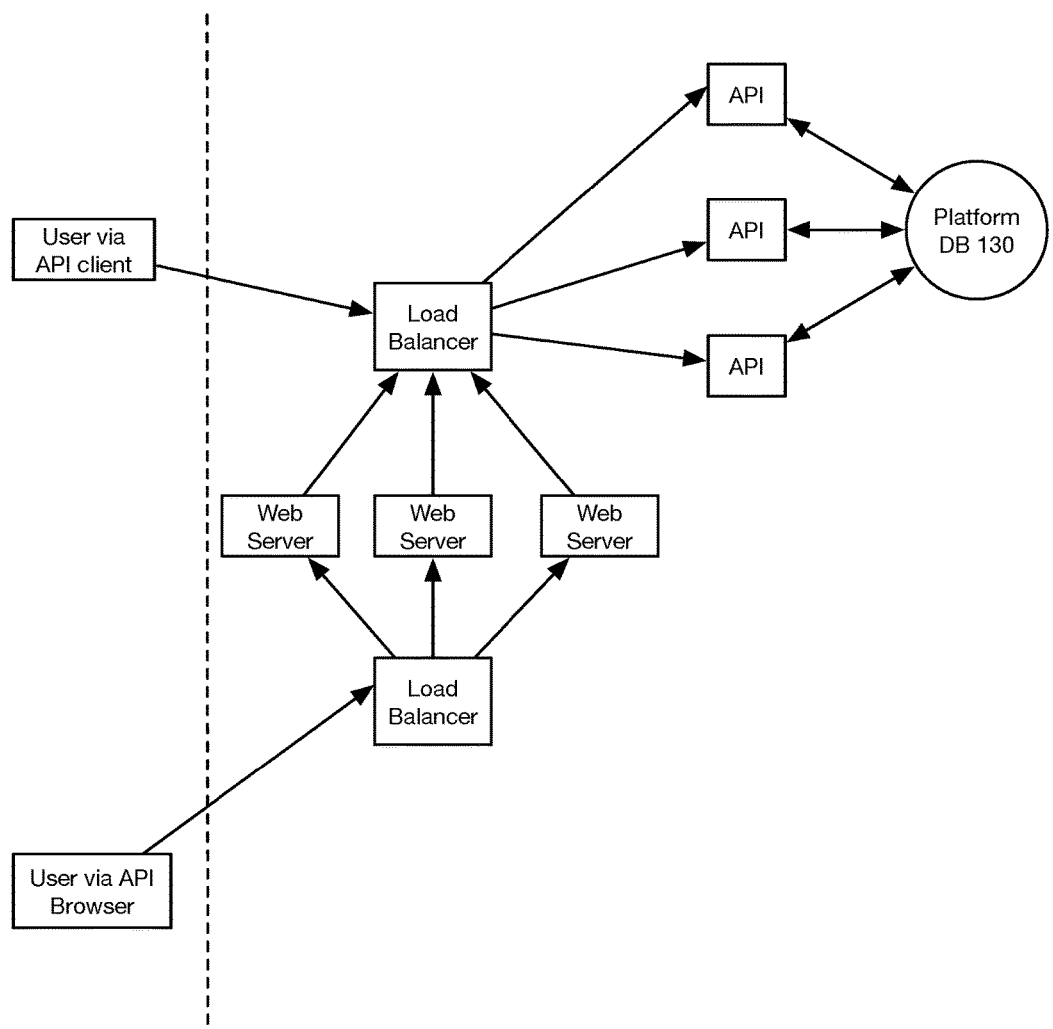
FIG. 3 illustrates a schematic representation of a system for implementing an intelligent API in accordance with one or more embodiments of the present application.

As shown by way of example in FIG. 3, the system enables a user to implement and/or interact with the API 105 in multiple ways including via an API client application and/or via API web browser implemented over the web.

The intelligent optimization platform 110 may be implemented using a combination of computing servers. Preferably, the intelligent optimization platform is implemented via a distributed networked computing system, such as cloud computing systems, that allows the many processes implemented by the intelligent optimization platform 110 to be implemented in parallel and among disparate computers thereby, in some embodiments, mitigating the possibility of failure or bottlenecking in the optimization pipeline of the intelligent optimization platform 110. Accordingly, the intelligent optimization platform 110 may be implemented as a remote web service accessible by multiple clients over the Internet, the Web, or any suitable communication network (e.g., a global area network, a wide area network, a local area network, etc.) that may function to place disparate computing resources in operable connection and communication.

The plurality of intelligent queue worker machines 120 preferably relate to services operating on the intelligent optimization platform 110 that executes code asynchronously with respect to other services or queue working machines of the platform 110. In some embodiments, each of the plurality of intelligent queue worker machines 120 functions to selectively trigger one or more optimization requests to one or more optimization engines of the ensemble of optimization engines 140. And, once the work on the optimization request is completed by the selected optimization engine(s), the queue working machine returns the responses or results to the platform database 130.

The plurality of intelligent queue worker machines 120 may be specifically configured with logic that enables each of the machines 120 to make dynamic and intelligent decisions in the selections of an ensemble component of the plurality of ensemble of optimization models 140. That is, each of the plurality of intelligent queue worker machines may function to selectively choose one or more optimization models of the ensemble 140 to execute one or more portions of an optimization work request.

The ensemble of optimization models 140 may include any number of models including, for example: a Low-Discrepancy sequence model, a Metric Optimization Engine (MOE) model (and variants thereof; e.g., MOE with one-hot encoding), a Tree-structured Parzen Estimators (TPE) model and variants thereof, a Latin Hypercube model, a Swarm model, and the like. Each of these models of the example ensemble of optimization models may function to encode categorical parameters differently from other member models of the ensemble and may include some interdependencies that require combinations of the models to work together. Each of these models may be individually selectable or selectable in combination by the intelligent worker queue machines 120.

The ensemble of optimization models 140 preferably includes a plurality of disparate optimization models that operate to optimize parameters, features, models, system architectures and the like using varying optimization algorithms. In a preferred embodiment, the ensemble of optimization models 140 define a core optimization engine of the intelligent optimization platform 110. The features and the parameters of the core optimization engine comprising the ensemble of optimization models 140 may also be optimized continually by one or more of the intelligent queue worker machines 120 (e.g., using Hyperopt, etc.).

The ensemble of optimization models 140 may include any number of models including, for example: a Low-Discrepancy sequence model, a Metric Optimization Engine (MOE) model (and variants thereof; e.g., MOE with one-hot encoding), a Tree-structured Parzen Estimators (TPE) model and variants thereof, a Latin Hypercube model, a Swarm model, and the like. Each of these models of the example ensemble of optimization models may function to encode categorical parameters differently from other member models of the ensemble and may include some interdependencies that require combinations of the models to work together. Each of these models may be individually selectable or selectable in combination by or using the intelligent worker queue machines 120.

In a preferred embodiment, the plurality of intelligent queue working machines 120 may be implemented on a separate computing server than the API 105. In this way, long-running asynchronous processes do not adversely affect (e.g., slow down) a performance of an API computing server and mainly, a capacity of the API computing server to service API requests.

Additionally, the plurality of intelligent queue worker machines 120 include multiple, distinct intelligent queue worker machines 120 that coordinate optimization work request from the shared work queue 135 received via the API 105 with the ensemble of optimization models 140.

A first example intelligent queue working machine may function to implement Modelfit or Hyperopt that typically functions to tune one or more of the hyperparameters of the optimization models of the ensemble concurrently with the processing of the optimization work requests received via the API 105. In one implementation, Modelfit or Hyperopt may be used to tune hyperparameters of one of the optimization models of the ensemble 140. After receiving a set of observations based on the suggestions for the set of parameters, the first queue worker machine may implement Modelfit or Hyperopt to model fit the hyperparameters of the selected optimization models in order to generate improved and new values for the set of hyperparameters via Nextpoints or the like. In some embodiments, the first queue worker machine may function to optimize the hyperparameters of the selected optimization models based on a return of a set of observations. However, it shall be noted that observations may be generated in any suitable manner including in the absence of suggestions by the system 100.

A second example intelligent queue working machine may function to implement Nextpoints that typically functions to generate or suggest new, optimized values for the parameters of the optimization work request. Accordingly, such intelligent queue working machine may function to select one or more of the optimization models of the ensemble 140, such as one or more machine learning models, for generating the new, optimized parameter values.

A third example intelligent queue working machine may function to implement an Importance algorithm that typically functions to judge or determine an importance of the hyperparameters submitted with the optimization work request (e.g., hyperparameters of an external model). This example intelligent queue worker machine may additionally function to analyze and determine an importance of features, hyperparameters, and architectures of the optimization models with respect to a given optimization work request; meaning the identified importance hyperparameters, features, or the like may have a significant impact on an account of a suggestion or generated parameter values. Accordingly, the intelligent queue worker machine of such example may function to recognize different hyperparameters and/or features of an optimization model as being important and non-important based on the optimization work request data (e.g., based on the hyperparameters to be optimized). Thus, the intelligent queue worker machine may function to assign or attribute distinct importance values to the hyperparameters and/or features of the optimization models so that these hyperparameters and the like may be ranked and considered with greater weight in a correlated process, such as re-tuning via Hyperopt or the like.

It shall be noted that the plurality of intelligent optimization worker machines 120 may not be limited to the above-noted examples, but rather is an extensible group of intelligent machines that may be modified to include additional and/or different intelligent worker machines that may be configured or programmed to perform any suitable optimization task of hyperparameters of machine learning models and/or related tasks to the processes and methods described herein.

The platform database 130 functions to collect and stores any or all values generated by the system 100 including values generated when executing an optimization work request by the intelligent optimization platform 110. Specifically, each of the plurality of intelligent queue worker machines may function to store within the platform database 130 optimized hyperparameter values, optimized parameter values of an optimization work request, suggestions, surrogate models, partial information responses, and the like. The API 105 may be operable communication with the platform database 130 via a communication network and may function to pull suggestions and/or response data via an API call or request.

The machine learning models, optimization models, and/or the ensemble of machine learning models may employ any suitable optimization algorithms and/or machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the intelligent optimization platform 110 and/or other components of the system 100.

The system 100 may additionally include a surrogate model generator (implemented via one or more of the optimization models 140) that may be implemented by the intelligent optimization platform 110. Specifically, when an API request is received by the system 100 that requests a status or suggestions of a partially completed (or incomplete) optimization work request, the intelligent optimization platform 110 may function to identify candidate data points and other data (including suggested parameter values and optimized hyperparameters values) generated by each of the plurality of intelligent queue worker machines 120 for responding to the partially completed optimization work request and further, may trigger one or more of the optimization models of the ensemble of optimization models to generate a surrogate (or proxy) model that can be used to test the uncertainty and/or the likelihood that a candidate data point would perform well in an external model. In one example, the system 100 may function to obtain hyperparameter values of a most recent job of a first intelligent queue worker machine implementing Hyperopt and cause one of the optimization models 140, such as MOE, to generate the surrogate model using the hyperparameter values to test how well the candidate parameter value data points may perform.

The system 100 may also implement a ranking system 155 that functions to rank the suggestions for a given optimization work request (or across multiple optimization work requests for a given user) such that the suggestions having parameter values most likely to perform the best can be passed or pulled via the API 105. The ranking system 155 may be implemented in any suitable manner including by the one or more optimization algorithms of the ensemble 140 that generated the suggestions. For instance, if MOE is used to generate a plurality of suggestions for responding to an optimization work request, the system 100 may function to use MOE to implement the ranking system 155.

It shall be noted that the sub-systems and components of the system 100 may be connected or placed in operable communication using any suitable network and any suitable manner. For instance, the components of the system 100 may be connected directly or indirectly over a network. The network may include any public (e.g., the Internet) or private network (e.g., intranet), a virtual private network, a wireless local area network, a local area network, a wide area network, a wireless wide area network, a global area network, a cellular network, any combination of the aforementioned and the like.

2. Method for Implementing an Intelligent API

Figure 2:
FIG. 2 illustrates a method for implementing an intelligent API in accordance with one or more embodiments of the present application.

As shown in FIG. 2, a method 200 for implementing an intelligent application program interface (API) that enables efficient and intuitive interaction with a remote intelligent optimization platform includes accessing the intelligent API S205, implementing a first API function (e.g., a first API call) to create an optimization work request S210, implementing a second API function (e.g., a second API call) to access suggestions from the intelligent optimization platform for the tunable parameters of the optimization work request 220, implementing a third API function (e.g., a third API call) to create an observation object via the intelligent API S230, and implementing an optimization feedback loop based on receipt of observations data via the intelligent API S240.

S205, which includes accessing the intelligent API S205, functions to enable a remote user or user system to establish an API account and API account access via one or more modes.

In a first implementation, S205 enables a user or user system to enroll via a web browser that is operably connected to the systems implementing the remote intelligent optimization platform. Using the web browser, a user and/or user's system may function to establish API account credentials and a user profile.

In a second implementation, S205 enables a user or user system to download an API client application that once download and implemented by a user enables the user to enroll for an API account similar to the first implementation.

In response to a successful enrollment, S205 may function to provide or transmit an API key to the user. The API key provided by S205 may function to enable the user to interact with the API account as well as implement one or more functionalities of the intelligent API and also, generate API requests and access one or more web resources via the intelligent API.

S210, which includes implementing or executing a first API function to create an optimization work request, functions to enable a user to input details of a desired optimization work request to be processed by the intelligent optimization platform. That is, the first API function enables a user to define an experiment or optimization trials including identifying variables, such as hyperparameters, constants (e.g., bounds, etc.), performance thresholds, and the like (tuning parameters) that may be used by the method 200 to govern a manner in which an intelligent optimization platforms an execution of the optimization work request.

Accordingly, in a preferred embodiment, S210 may function to use the first API function to create or build an optimization work request that sets a plurality of tuning parameters for tuning or optimizing hyperparameters of a machine learning model (e.g., external model) of a subscriber to the one or more services of the intelligent optimization platform. In such preferred embodiment, S210 may additionally or alternatively function to initialize one or more optimization operations or functions of the intelligent optimization platform including, but not limited to, initializing an operation of each of a plurality of distinct tuning worker instances of the platform that execute distinct tuning tasks for tuning the hyperparameters of the machine learning model according to the plurality of tuning parameters. Preferably, the hyperparameters comprise parameters of an external machine learning model having values set before a training or the learning process applied to the external machine learning model and are not derived during the training or the learning processes involving the external machine learning model.

In a first implementation, if a user implements the first API function to create an optimization work request via an API web browser or the like, the intelligent API may function to provide an interactive illustration via the API web browser that demonstrates one or more methodologies for generating an optimization work request via the intelligent API.

In a second implementation, if the user implements the first API function to create an optimization work request via the API client application, the intelligent API enables a user to provide input or experiment details for creating the optimization work request directly with API code. Preferably, the API code of the system may include a custom API code that is specifically designed for the intelligent API and for controlling one or more operational aspects of the intelligent optimization platform. Thus, the API code terms may include a plurality of predefined terms and/or characters that may be comprehendible by the intelligent API and consequently, create executable controls for operating the intelligent optimization platform.

In a preferred embodiment, creating the input details for generating an optimization work request via the intelligent API includes descriptive and parameter inputs of the optimization work request. For instance, one or more required input fields may include: providing name input for identifying the optimization work request via the intelligent API; providing the tunable hyperparameters for the optimization work request that the user desires for the intelligent optimization platform to optimize to achieve a desired metric of a machine learning model or the like; providing bounds input (e.g., max/min) that function to constrain the possible values that the tunable parameters may occupy during optimization; precision input via that defines a level of precision required for the parameter values (e.g., int or integer; double or include decimal values, etc.); providing type categorical input or categorical values (or list) that the intelligent optimization platform can select from during an optimization session or trial; providing metrics input indicating the metrics (e.g., performance metrics including accuracy, computational speed, etc.) to be measured; an observation budget input indicating an amount of suggestions (e.g., distinctly generated values for the hyperparameters) the user desires the intelligent optimization platform to generate; and metadata input that enables tracking of one or more aspects of the optimization work request.

In one implementation, the observation budget input provided via the intelligent API may function to configure or set multiple operation modes of the intelligent optimization platform. That is, S210 may function to execute the first API function call to set a mode of operating of the intelligent optimization platform, which is selected from a plurality of distinct modes of operation based on at least one tuning parameter (e.g., budget) provided with the optimization work request. The multiple operation modes may include a first exploration mode, a second combined exploration/exploitation mode, and a third exploitation mode.

Additionally, or alternatively, upon receiving the observation budget indicating a number of suggestions that a user desires the intelligent optimization platform to generate based on one or more optimization work requests, S220 may function to configure mode triggering thresholds that may be used by the intelligent optimization platform to selectively switch an operation mode of the platform. That is, S210 may function to execute the first API function call to set one or more mode switching conditions that, when satisfied by one or more metrics of the intelligent optimization platform during an execution of the optimization work request, automatically switches a mode of operation of the intelligent optimization platform from a first mode of operation to a second mode of operation. In such embodiments, the intelligent optimization platform functions to tune or optimize the hyperparameters differently in the second mode of operation than in the first mode of operation. For instance, based on an optimization budget, S220 may function to set a first mode switching triggering threshold that transitions an optimization of the hyperparameter values from a first exploration mode to a second combined exploration/exploitation mode. Additionally, in such instance, S220 may function to set a second mode switching threshold that transitions the intelligent optimization platform from the second combined exploration/exploitation mode to a third exploitation mode of the intelligent optimization platform.

Specifically, for each operation mode of the intelligent optimization platform, only a predetermined set of optimization models of the ensemble of optimization models may be implemented or requested by a plurality of optimization worker machines of the platform. That is, each mode limits the optimization resources available to the plurality of optimization worker machines. In each mode, the predetermined set of optimization models is preferably different, such that each set of predetermined optimization models available under each operation mode functions to produce different results given a same set of hyperparameters and/or values to optimize.

Accordingly, the mode triggering thresholds for each operation mode is preferably set by S220 using the observation budget prior to or contemporaneously with a processing of the optimization work request(s) by the intelligent optimization platform. As an example, using the function API function, a user may set an observation budget value of twenty (20) suggestions. The intelligent API may function to set at an exploration mode threshold to zero; meaning at the initialization of the optimization processes, the intelligent optimization platform should be configured to use a first predetermined set of optimization models that function to explore preferably in a wide range of values, potential values for the hyperparameters of an optimization work request. The intelligent API may additionally function to set an exploration/exploitation mode threshold to ten (10), such that once ten suggestions have been created in the exploration mode, the intelligent optimization platform automatically switches to and configures the exploration/exploitation mode which requires the intelligent optimization platform to use a second predetermined set of optimization models (e.g., tuning sources) for performing a combination of exploration with hyperparameter values and exploitation of any suggested hyperparameter values. Lastly, in such example, the intelligent API may function to set an exploitation mode threshold to fifteen (15), such that once a total of fifteen suggestions for the optimization work request have been suggested or generated in the prior exploration mode and the exploration/exploitation mode, the intelligent optimization platform switches to the exploitation mode which requires the intelligent optimization platform to use a third predetermined set of optimization models for performing only an exploitation of any suggested hyperparameter values.

Accordingly, configuring the intelligent optimization platform to switch operation/optimization modes enables a balanced approach to optimizing hyperparameter values of a model according to an observation budget of the optimization work request thereby avoiding over exploration or exploitation and under exploration and exploitation.

Once a user successfully executes the first API function to create an optimization work request, the intelligent API may trigger a start of the optimization process by passing the optimization work request to the intelligent optimization platform.

It shall be noted that the intelligent optimization platform may function to execute a plurality of first API function calls for a plurality of optimization work requests for a given subscriber to the services of the intelligent optimization platform. Additionally, or alternatively, responsive to the execution of the plurality of first API function calls, the intelligent optimization platform may function to instantiate distinct clusters of tuning worker instances that each operate independently to optimize hyperparameters one of the plurality of optimization work requests. That is, results of each of the distinct clusters of tuning worker instances may not interfere or influence results or generated values of other distinct clusters of tuning worker instances.

Additionally, after the intelligent optimization platform has initiated and/or completed work on the submitted optimization work request, S220, which includes implementing a second API function to create and/or access suggestions from the intelligent optimization platform for values of the tunable hyperparameters of the optimization work request, functions to enable a user to obtain or access one or more generated suggestions via the intelligent API. That is, S220 may function to execute the second API call function to identify a plurality of raw values for the hyperparameters of an optimization work request that were generated by the intelligent optimization platform. In such embodiments, S220 may function to identify and/or obtain the plurality of raw values for the hyperparameters using metadata provided with the optimization work request to query a platform database of the intelligent optimization platform.

Accordingly, using the second API function enables a user of the intelligent API to provide input details optionally with metadata that may trigger the intelligent API to create and/or pull suggestions data from a platform database of the intelligent optimization platform. In such embodiment, S220 may function to generate one or more suggestions comprising proposed hyperparameter values selected from a plurality of raw values for the hyperparameters of the external machine learning model. The intelligent API may function to return the hyperparameter values within the accessed suggestions data in any suitable manner including by generating a suggestions assignments that outputs the suggested parameter values along with any associated categorical values (if any) and combined with user-specified metadata that describes uses of the parameter values and the categorical values (if any).

Additionally, or alternatively, S220 may function to execute the second API call function to instantiate a surrogate machine learning model for the external machine learning model of a subscriber to the services of the platform. In such embodiments, instantiating the surrogate machine learning model includes estimating an algorithmic structure of the subscriber machine learning model based on the hyperparameters of the tuning work request and the plurality of raw values for each of the hyperparameters of the subscriber machine learning model and using the estimation of the algorithmic structure of the subscriber machine learning model to define and/or create the surrogate machine learning model. For instance, the estimation of the algorithmic may be used as input into a selected optimization or tuning source of the intelligent optimization platform to thereby generate the surrogate machine learning model. In such embodiments, S220 may function to use the surrogate machine learning model to test a performance of the plurality of raw values of the hyperparameters based on input into a structure of the surrogate model of the plurality of raw values for each of the hyperparameters of the external machine learning model.

In a preferred embodiment, the surrogate machine learning model comprises a hypothesis of or a proxy for the external machine learning model when a structure of the subscriber machine learning model is not known to the intelligent optimization platform.

Additionally, or alternatively, based on results of testing the plurality of raw hyperparameter values with the surrogate model, S220 may function to identify a subset of the plurality of raw values for each of the hyperparameters for generating one or more suggestions. Accordingly, the one or more suggestions may include proposed hyperparameter values identified from the subset of the plurality of raw values. In some embodiments, S220 may function to identify the subset of the plurality of raw values for each of the hyperparameters includes identifying distinct raw values from the plurality of raw values that satisfy or exceed a performance threshold. The performance threshold may be a predetermined or static value, in some embodiments. In other embodiments, the performance threshold may be a dynamic value that changes according to a number of raw value for the hyperparameters generated by the intelligent optimization platform. For instance, if a number of raw hyperparameter values generated by the intelligent optimization platform increases, a minimum value of the performance threshold may dynamically increase. The converse may also be true, in some embodiments.

Additionally, or alternatively, in some embodiments, S220 may function to generate a surrogate machine learning model based on a detection or execution of an intervening API call function. That is, in such embodiments, S220 may function to execute an intervening API call function that operates to generate the one or more suggestions ahead of an estimated or a scheduled completion of an optimization work request. Accordingly, in response to executing the intervening API call function, S220 may function to instantiate a surrogate machine learning model in lieu of the external machine learning model and test a performance of the plurality of raw values for each of the hyperparameters when installed in the surrogate machine learning model.

Additionally, or alternatively, S220 may function to configure the intelligent API to enable parallel creation and/or access of suggestions in circumstances when a user has multiple pending optimization work requests being processed or that have been completely processed by the intelligent optimization platform. In such embodiments, the intelligent API may enable a user to input details for multiple optimization work request and correspondingly, return via intelligent API output, multiple suggestions that include associated multiple assignments (e.g., suggested parameter values).

Additionally, or optionally, S225, which includes evaluating the assignment values of a suggestion returned via the intelligent API, enables the user and/or user system to evaluate the suggested hyperparameter values in a real-world (external) model. Preferably, the user and/or user system may function to collect observations data including performance values, such as resulting values for observed metrics (e.g., accuracy, efficiency/speed, etc.) of the model.

S230, which includes implementing a third API function to create an observation object via the intelligent API, functions to enable a creation of an observation object that includes input data relating to or including collected observations data. The observations data may include any measured values of the metrics of the user's model together with additional data or values that may have influenced a performance of the user's model.

The third API function of the intelligent API may additionally enable the user to identify to provide an indication or data describing the suggested parameter values or a suggestions ID of a suggestion which was used in generating the real-world observations. In this way, a system implementing the method 200 may associate the collected observations data with the corresponding suggestions at the platform data of the intelligent optimization engine.

S240, which includes implementing an optimization feedback loop based on receipt of observations data via the intelligent API, functions to enable an optimization feedback loop for optimizing parameter values based on actual or real-world observed data values. The optimization feedback loop preferably includes looping S220-S230 until a desired optimization criteria set by a user is satisfied or met. The observations data, as referred to herein, may generally refer to observed data that is collected during a trial implementations with the suggestion parameters values being used as input into an external (or real-world) model.

Accordingly, once the generated suggestions are made available to a user's system, real-world implementation of the suggestions parameter values may be performed using an external model and the observed results of a measured metric of the model (e.g., observations data) may be reported back via the intelligent API. The report of the observations data may trigger or continue an optimization feedback loop that involves the receipt of observations data, the generation of new suggestions based at least in part on the observations data and making the updated suggestions available to the user's system via the intelligent API. The optimization feedback loop may persist until a desired value of the measured metric of the external model is achieved.

In some embodiments, the optimization feedback loop of S240 may be automatically stopped based on one or more predetermined stopping criteria. The one or more stopping criteria may relate to any one or more of a plurality of user-designated triggers or implied (e.g., based on inputs defined via the first API function for the optimization work request) triggers that function to indicate to the intelligent optimization platform executing the optimization work request that a cease of optimization trials are desired or required.

In some embodiments, the one or more predetermined automatic stopping criteria includes one or more predetermined thresholds that may be applied to the one or more suggestions generated for the parameters of an optimization work request. In such embodiments, if the parameters of the optimization work request meet or satisfy the one or more predetermined threshold, this may trigger a stop optimization request, which instructs a system and/or intelligent optimization platform to cease in the execution of the subject optimization work request. For instance, if a metric of goodness or fit of a generated suggestion for a model meets or exceeds a pre-set performance threshold, this may trigger a stop optimization request.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A system implementing an application programming interface that interfaces with a machine learning tuning service for tuning a machine learning model for one or more of improved accuracy and computational performance, the system comprising:
an intelligent application programming interface (API) that is in operable communication with a machine learning tuning service and that:
implements a first API call function that:
includes a tuning work request that sets a plurality of tuning parameters for tuning, by the machine learning tuning service, hyperparameters of a machine learning model, wherein the machine learning model includes a machine learning model that is external to the machine learning tuning service and implemented by a subscriber to the machine learning tuning service;
causes an operation of each of a plurality of distinct tuning worker instances of the machine learning tuning service that execute distinct tuning tasks for tuning the hyperparameters of the machine learning model according to the plurality of tuning parameters;
implements a second API call function that:
provides one or more suggestions comprising proposed hyperparameter values selected from a plurality of raw values for each of the hyperparameters of the machine learning model; and
implements an API function that returns to the machine learning tuning service performance metrics of the machine learning model based on the proposed hyperparameter values.

2. The system according to claim 1, wherein the hyperparameters comprise parameters of the machine learning model having values set before a training or the learning process applied to the machine learning model and are not derived during the training or the learning processing.

3. The system according to claim 1, wherein implementing the second API call function includes:
instantiating a surrogate machine learning model for the machine learning model; and
using the surrogate machine learning model to test a performance of the plurality of raw values of the hyperparameters based on input into the surrogate machine learning model of the plurality of raw values for each of the hyperparameters of the machine learning model.

4. The system according to claim 3, wherein the surrogate machine learning model comprises a hypothesis of or a proxy for the machine learning model when a structure of the machine learning model is not known to the machine learning tuning service.

5. The system according to claim 3, wherein instantiating the surrogate machine learning model includes estimating an algorithmic structure of the surrogate model based on the hyperparameters of the tuning work request and the plurality of raw values for each of the hyperparameters of the machine learning model.

6. The system according to claim 3, wherein instantiating the surrogate machine learning model further includes using an estimation of the algorithm structure of the machine learning model to define and/or create the surrogate machine learning model.

7. The system according to claim 3, wherein implementing the second API call function further includes:
identifying a subset of the plurality of raw values for each of the hyperparameters based on results of the testing with the surrogate machine learning model, wherein the proposed hyperparameter values of the one or more suggestions comprise the subset of the plurality of raw values.

8. The system according to claim 7, wherein identifying the subset of the plurality of raw values for each of the hyperparameters includes identifying distinct raw values from the plurality of raw values that satisfy or exceed a performance threshold.

9. The system according to claim 1, wherein the machine learning tuning service includes:
a cluster of distinct machine learning tuning sources that operate to generate the plurality of raw values for the hyperparameters for the machine learning model,
wherein each of the plurality of distinct tuning worker instances selectively operates one distinct machine learning tuning source of the cluster of distinct machine learning tuning sources.

10. The system according to claim 1, wherein the intelligent API further:
implements an intervening API call function to generate the one or more suggestions ahead of an estimated or a scheduled completion of the tuning work request,
wherein in response to implementing the intervening API call function, instantiating a surrogate machine learning model in lieu of the machine learning model; and
tests a performance of the surrogate machine learning model based on input of the plurality of raw values for each of the hyperparameters of the machine learning model.

11. The system according to claim 10, wherein in response to the intervening API call function, automatically selecting by one of the plurality of distinct tuning instances one of the plurality of distinct machine learning tuning sources to generate a surrogate model for testing a performance of the plurality of raw values for the hyperparameters.

12. The system according to claim 1, wherein implementing the first API call function sets a mode of operation of the machine learning tuning service which is selected from a plurality of distinct modes of operation based on at least one tuning parameter provided with the tuning work request.

13. The system according to claim 1, wherein implementing the first API call function sets one or more switching conditions that, when satisfied, switches a mode of operation of the machine learning tuning service from a first mode of operation to a second mode of operation, wherein the machine tuning service optimizes the hyperparameters differently in the second mode of operation than in the first mode of operation.

14. The system according to claim 1, wherein the operation of each of the plurality of distinct tuning worker instances is asynchronous.

15. The system according to claim 1, wherein
the machine learning tuning service implements a plurality of first API function calls for a plurality of tuning work requests for the subscriber to the machine learning tuning service,
responsive to the implementation of the plurality of first API function calls, the machine learning tuning service instantiates distinct clusters of tuning worker instances that each operate independently to optimize hyperparameters of one of the plurality of tuning work requests.

16. A method implementing an application programming interface that interfaces with a machine learning tuning service, the method comprising:
implementing an application programming interface (API) that is in operable communication with the machine learning tuning service that:
implements a first API call function that:
includes an tuning work request that sets a plurality of tuning parameters for tuning, by the machine learning tuning service, hyperparameters of a machine learning model, wherein the machine learning model includes a machine learning model that is implemented by a subscriber to the machine learning tuning service;
initializes an asynchronous operation of each of a plurality of distinct tuning worker instances of the machine learning tuning service that execute distinct tuning tasks for tuning the hyperparameters of the machine learning model according to the plurality of tuning parameters;
implements a second API call function that:
generates proposed hyperparameter values selected from a plurality of raw values for each of the hyperparameters of the machine learning model; and
implements an API function that returns to the machine learning tuning service performance metrics of the machine learning model based on the proposed hyperparameter values.

17. The online method according to claim 16, wherein implementing the second API call function includes:
instantiating a surrogate machine learning model for the machine learning model; and
using the surrogate machine learning model to test a performance of the plurality of raw values of the hyperparameters based on input into the surrogate machine learning model of the plurality of raw values for each of the hyperparameters of the machine learning model.

18. The online method according to claim 17, wherein
the surrogate machine learning model comprises a hypothesis of or a proxy for the machine learning model when a structure of the machine learning model is not known to the machine learning tuning service.

19. The online method according to claim 16, wherein the API further:
implements an intervening API call function to generate the one or more suggestions ahead of an estimated or a scheduled completion of the tuning work request,
wherein in response to executing the intervening API call function,
instantiating a surrogate machine learning model in lieu of the machine learning model; and
testing a performance of the surrogate machine learning model based on input of the plurality of raw values for each of the hyperparameters of the machine learning model.

20. A system implementing an application programming interface that interfaces with a machine learning tuning service for tuning a machine learning model, the system comprising:
an intelligent application programming interface (API) that is in operable communication with a machine learning tuning service that:
implements a first API request function that:
includes a tuning work request that sets a plurality of tuning parameters for tuning, by the machine learning tuning service, hyperparameters of a machine learning model, wherein the machine learning model includes a machine learning model that is external to the machine learning tuning service and implemented by a subscriber to the machine learning tuning service;
initializes an operation of each of a plurality of distinct tuning worker instances of the machine learning tuning service that execute distinct tuning tasks for tuning the hyperparameters of the machine learning model according to the plurality of tuning parameters;
implements a second API request function that:
provides one or more suggestions comprising proposed hyperparameter values selected from a plurality of raw values for each of the hyperparameters of the machine learning model.

* * * * *